US007143397B2

(12) United States Patent
Imaura

(10) Patent No.: US 7,143,397 B2
(45) Date of Patent: Nov. 28, 2006

(54) XML DATA ENCODING AND DECODING

(75) Inventor: Takeshi Imaura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/047,958

(22) Filed: Jan. 15, 2002

(65) Prior Publication Data

US 2003/0018466 A1 Jan. 23, 2003

(30) Foreign Application Priority Data

Feb. 2, 2001 (JP) ............................. 2001-027462

(51) Int. Cl.
*G06F 9/45* (2006.01)
(52) U.S. Cl. ..................................... 717/136
(58) Field of Classification Search ................ 717/136; 715/513
See application file for complete search history.

(56) References Cited

U.S. PATENT DOCUMENTS

| 6,871,320 | B1* | 3/2005 | Morihara et al. ........... 715/513 |
| 2001/0056504 | A1* | 12/2001 | Kuznetsov ................... 709/310 |
| 2002/0100027 | A1* | 7/2002 | Binding et al. ............. 717/137 |

FOREIGN PATENT DOCUMENTS

| JP | H09-261072 | | 10/1997 |
| JP | 10187530 | * | 7/1998 |
| JP | 2000028359 | * | 2/2000 |
| JP | 2000-101442 | | 4/2000 |
| JP | 2000357568 | * | 11/2000 |

OTHER PUBLICATIONS

Takeshi Imamura and Hiroshi Maruyama, "Mapping between ASN.1 and XML", IEEE, Applications and the Internet, 2001. Proceedings. 2001 Symposium on Jan. 8-12, 2001, pp. 57-64 (9 pages including date proof).*
Takeshi Imamura and Hiroshi Maruyama, "Specification of Translation Rule from ASN.1 Abstract Syntax Definition to DTD", IBM, Security Suite, Jan. 2000 (29 pages).*
Takeshi Imamura and Hiroshi Maruyama, "ASN.1/XML Translator", IBM, Security Suite, Apr. 2001. (18 pages).*
US 6,925,596, 08/2005, Maruyama et al. (withdrawn)*

* cited by examiner

*Primary Examiner*—Mary Steelman
(74) *Attorney, Agent, or Firm*—Scully, Scott, Murphy & Presser, P.C.; Lisa M. Yamonaco, Esq.

(57) ABSTRACT

The present invention provides methods, systems and apparatus to improve XML data encoding (compression) decoding (decompression) efficiency. In an example embodiment, a syntax type generator 2-1 converts a DTD into an ASN.1 abstract syntax type, and a separation unit 2-2 separates text from XML data that conforms to the DTD. Then, a syntax value generator 2-3 converts the XML data (the syntax of an element) from which the text has been separated into an ASN.1 abstract syntax value that conforms to the ASN.1 abstract syntax type. Thereafter, following the conversion by a transfer syntax generator 2-4 of the ASN.1 abstract syntax value into an ASN.1 transfer syntax, the separated text is compressed by a compression unit 2-5 and encoded XML data is generated by a combining unit 2-6 that combines the ASN.1 transfer syntax and the compressed text.

28 Claims, 5 Drawing Sheets

XML DATA ENCODING AND DECODING

FIELD OF THE INVENTION

The present invention relates to a technique for encoding and decoding data. It more particularly relates to improving the compression and decompression rates when XML (Extensible Markup Language) data is encoded and decoded.

BACKGROUND

Recently, attention has been drawn to XML as a data expression means for use on the Internet. XML is an extensible meta language, and a user can uniquely define its grammar. In addition, while XML can provide logical meaning for each element, it is much easier to use than HTML (Hypertext Markup Language) for data processing. It is therefore anticipated that XML will become the standard expression method and will be used for the structural languages that will be employed for the exchange of e-commerce documents, for example. Note that the specification for XML is contained in "W3C.Extensible Markup Language (XML) 1.0, 1998, http://www.w3.org/TR/REC-xml".

Since characters are used to write XML data, its readability is high, as is its redundancy. Specifically, the meaning of an element is written mainly between start and end tags, and can be easily understood merely by referring to the contents, which, to reiterate, are written using characters. However, as characters are used to write all the contents, the total number of characters used is increased, and overall, the amount of data (the character count) required for an XML document is also increased. Thus, since a large number of characters are used, either a large memory capacity is required for the storage of data, and/or accompanying the increase in the amount of data, there is an increase in physical labor and time costs when the data is transferred via a network. Therefore, it would be convenient were XML data encoded (or compressed) to shorten the length of the code employed.

A variety of well known data compression methods are presently available, and include: run-length coding, Huffman coding, arithmetic coding and LZ77. Example in-detail descriptions of these compression methods may be found in: "A method for the construction of minimum-redundancy codes", Huffman, D. A., Proc. of the IRE, September, 1952; "The Data Compression Book", Mark Nelson and Jean Loup Gailly, Second Edition, M&T Books 1996; and "A universal algorithm for sequential data compression", Jacob Ziv and Abraham Lempel, IEEE Transactions on Information Theory, May, 1997.

However, these compression methods were not specially prepared XML, and when used for XML data, compression efficiency is not always high. Example specialized compression methods for XML data are: XMill, described in "XMill: an Efficient Compressor for XML data, 1999, http://www.research.att.com/sw/tools/xmill/", D. Suciu and H. Liefke; XMLZip, described in "XMLZip, 1999, http://www.xmls.com/products/xmlzip/xmlsip.html", XML Solutions Corp.; and XComp, described in "Study for an XML document compression algorithm using DTD", Kousaku Ikawa, graduation thesis prepared for the Information engineering course given by the Technology department of the Tokyo Institute of Technology, February, 2000.

According to the XMill reference, the content (text) portion of each element is extracted from XML data, and this extracted portion is referred to as a container. Then the structural portion is encoded using numerals, and subsequently, the text portion for each container is compressed using a compression method such as LZ77. Basically, data compression can be performed by an application without additional information, such as parameters, being required. As needed, a compression method for each container can be designated by setting a parameter, a process that increases compression efficiency. Further, since C is used to implement XMill, the compression speed is high.

According to the XMLZip reference, the depth of a root element is designated, and the designated portion is separated from a document element, following which ZIP is used to compress the remaining portion. Therefore, since the root element is not encoded operations on it can be performed directly. Further, since only the portion that is not so used is compressed, rapid document access is possible. It should be noted, however, that the compression efficiency provided by XMLZip is lower than that provided by XMill.

According to the XComp reference, of the structural portions that constitute XML data, a portion that is uniquely determined by employing DTD (Document Type Definition) is not encoded, and only that portion which can not be uniquely determined is compressed. Compression of the text portion is performed in the same manner as it is for XMill. That is, for data compression, the following procedures are performed. (1) XML data is divided into structure and content; (2) DTD is used to generate a push-down automaton (PDA); (3) PDA is used to generate an encoding transducer for encoding the structural portion; (4) numbers that are allocated for the individual nodes of the encoding transducer are output by continuously transferring the automaton while the structure is encoded; and (5) a method such as LZ77 is used to compress the code obtained for the structure and the contents of the elements, following which the compressed XML document is output.

Of the specialized compression methods employed for XML documents, a comparatively higher compression efficiency can be obtained with XComp, which does not encode part of he structural portion.

Even though the compression of XML documents, XComp is the superior method. However, according to a study performed by the present inventor, when XComp is used to process XML data having a specific structure, compression efficiency is reduced. That is, when the "?" operator or the "*" operator (includes the "+" operator) are employed for elements, compression efficiency is reduced.

The "?" operator is the one that is attached to the child element of a specific element in an element type declaration when the child element does not appear or appears only one time. According to XComp, when the "?" operator appears the "?" operator is represented by multiple choices each of which is shifted from one specific state to another, and an index is provided for the choice. Thereafter, when XComp is executed, an index provided for a selected choice is output, and since the number of available choices varies in consonance with how many "?" operators follow an initial "?" operator, when n "?" operators persist, for example, n+1 choices are present for the first "?" operator. Therefore, n+1 indexes are required, and O(log n) bits are needed to represent one index. Thus, when all the elements for which the "?" operators are employed, multiple indexes are enumerated, and since O(log n) bits are required to represent one index, O(nlog n) bits are required to represent all the indexes.

The "*" operator is the one that is attached to the child element of a specific element in an element type declaration when the child element does not appear or appears more than once. And the "+" operator is the one that is attached to the child element of a specific element in an element type declaration when the child element appears one or more times. Therefore, according to XComp, when the "*" operator (or the "+" operator) appears, the "*" (or the "+") operator is represented by two choices one of which is maintained in the same state or the other of which is shifted to different state, and an index is provided for each choice. Upon the execution of XComp, the index provided for a selected index is output, and when the multiple elements for which "*" operator is employed are present, multiple like indexes are enumerated. Thus, since the number of indexes is proportional to the number of elements that are present, when n elements are present, O(n) bits are required to represent all the indexes.

That is, with XComp, the number of bits of code is increased to represent a specific portion of the structural portions that are not uniquely determined by DTD, and a satisfactory compression efficiency can not always be obtained.

SUMMARY OF THE INVENTION

The present invention overcomes the problems described above. It is, therefore, one aspect of the invention to provide a method for encoding XML data (XML documents) that ensures a higher compression efficiency, and a method and a system therefor. The decoding of encoded XML data is performed when the order of the encoding processing is reversed.

Furthermore, the encoding or decoding method of the invention can be implemented as a system, and can also be provided as a program that permits a computer to perform the functions provided by the method.

BRIEF DESCRIPTION OF THE DRAWINGS

These and other aspects, features, and advantages of the present invention will become apparent upon further consideration of the following detailed description of the invention when read in conjunction with the following drawing figures.

Figure 1:
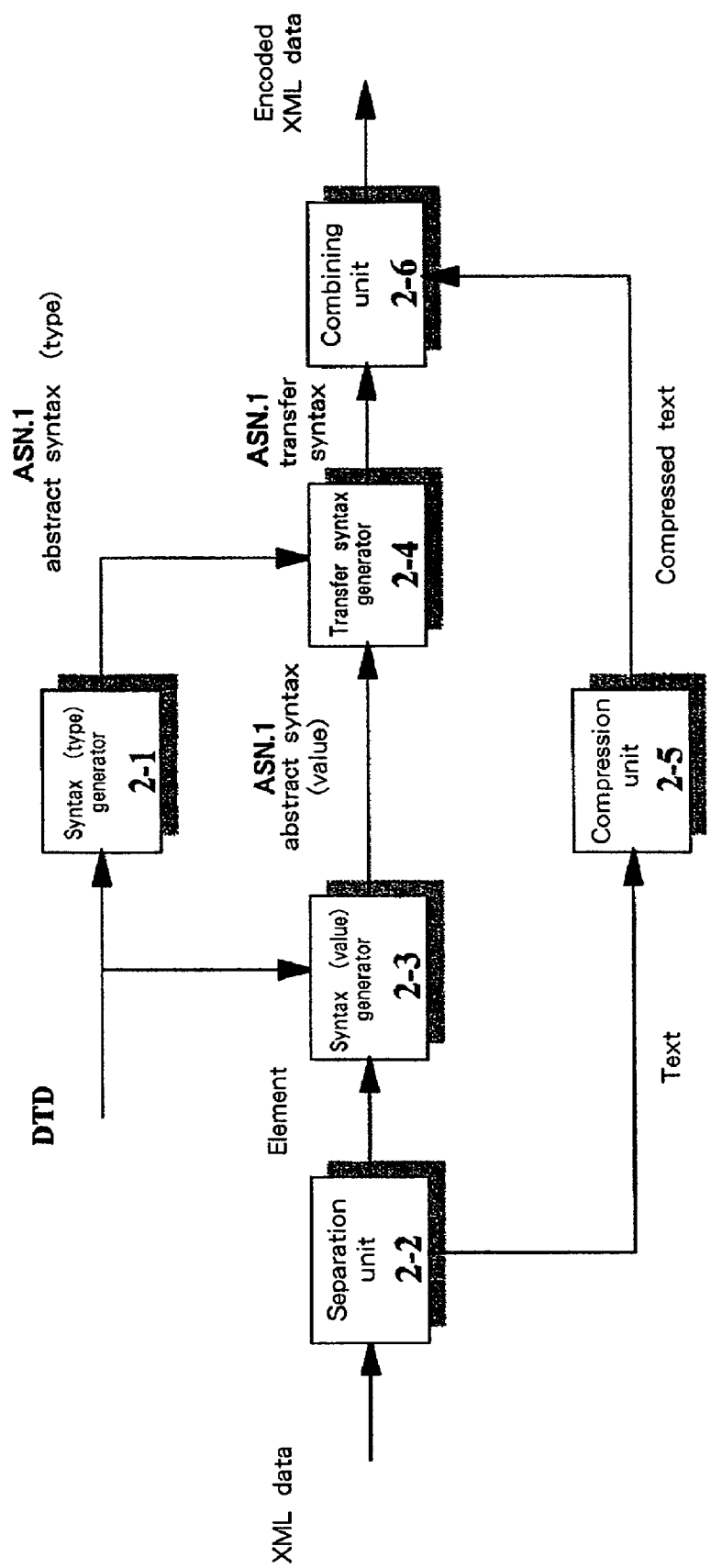
FIG. 1 is a functional block diagram showing an example encoding system according to a first embodiment of the present invention.

DESCRIPTION OF THE SYMBOLS 2-1: Syntax (type) generator
2—2: Separation unit
2-3: Syntax (value) generator
2-4: Transfer syntax generator
2-5: Compression unit
2-6: Combining unit
3-1: Syntax (type) generator
3-2: Transfer syntax decoder
3—3: Abstract syntax decoder
3-4: Combining unit
3-5: Separation unit
3-6: Decompression unit
9-1: DTD converter
9-2: XML data converter
9-3: Encoder
9-4: DTD converter
9-5: Decoder
9-6: XML data converter

DESCRIPTION OF THE INVENTION

The present invention overcomes the problems described above. Even though the compression of XML documents, XComp is the superior method. However, according to a study performed by the present inventor, when XComp is used to process XML data having a specific structure, compression efficiency is reduced. That is, when the "?" operator or the "*" operator (includes the "+" operator) are employed for elements, compression efficiency is reduced.

The "?" operator is the one that is attached to the child element of a specific element in an element type declaration when the child element does not appear or appears only one time. According to XComp, when the "?" operator appears the "?" operator is represented by multiple choices each of which is shifted from one specific state to another, and an index is provided for the choice. Thereafter, when XComp is executed, an index provided for a selected choice is output, and since the number of available choices varies in consonance with how many "?" operators follow an initial "?" operator, when n "?" operators persist, for example, n+1 choices are present for the first "?" operator. Therefore, n+1 indexes are required, and O(log n) bits are needed to represent one index. Thus, when all the elements for which the "?" operators are employed, multiple indexes are enumerated, and since O(log n) bits are required to represent one index, O(nlog n) bits are required to represent all the indexes.

The "*" operator is the one that is attached to the child element of a specific element in an element type declaration when the child element does not appear or appears more than once. And the "+" operator is the one that is attached to the child element of a specific element in an element type declaration when the child element appears one or more times. Therefore, according to XComp, when the "*" operator (or the "+" operator) appears, the "*" (or the "+") operator is represented by two choices one of which is maintained in the same state or the other of which is shifted to different state, and an index is provided for each choice. Upon the execution of XComp, the index provided for a selected index is output, and when the multiple elements for which "*" operator is employed are present, multiple like indexes are enumerated. Thus, since the number of indexes is proportional to the number of elements that are present, when n elements are present, O(n) bits are required to represent all the indexes.

That is, with XComp, the number of bits of code is increased to represent a specific portion of the structural portions that are not uniquely determined by DTD, and a satisfactory compression efficiency can not always be obtained.

Thus the invention to provides methods, apparatus and systems for encoding and decoding XML data (XML documents) that ensures a higher compression and decompression efficiency. Example embodiments of the present invention are described in detail while referring to the accompanying drawings. It should be noted, however, that the present invention can be employed for various other embodiments, and should not be limited to the embodiments described herein. Throughout the embodiments, the same reference numerals are used to denote corresponding or identical components.

In the following embodiments, mainly a method or a system will be described; however, as will be apparent to one having ordinary skill in the art, the present invention can be implemented as a computer-readable program. Therefore, the present invention can be provided by hardware or software, or a combination of hardware and software, and can be stored on an arbitrary computer-readable storage medium, such as a hard disk, a CD-ROM, an optical storage device or a magnetic storage device.

Furthermore, for the embodiments, an ordinary computer system can be used that comprises commonly employed system hardware resources, such as a central processing unit (CPU), a main memory (RAM), a nonvolatile memory (ROM), a co-processor, an image accelerator, a cache memory and an input/output controller (I/O). An external storage device, such as a hard disk drive, and communication means, for connecting to a network such as the Internet, can also be provided. Further, a variety of computer types, including personal computers, workstations and main frames, can be employed as the computer system.

FIRST EXAMPLE EMBODIMENT

1. Premise Conditions

Before beginning an explanation of the first embodiment, premised conditions will now be described concerning the processing performed during the embodiment.
  (1) The structure of XML data is defined by a grammar, which is designated for common use by a data encoding side and a decoding side. A grammar definition file, for example, is stored as external data at a predetermined IP address, and the IP address is used to refer to it when XML data is to be encoded or decoded. In this embodiment, DTD is used as the grammar definition, but this selection imposes no limitation on which grammar can be used, and XML Schema and RELAX, for example, can also be employed.
  (2) XML data consists only of elements and text, another method is used to manage others (e.g., attributes and process instructions). For example, attributes and process instructions can be represented as special elements and can be embedded in the XML data, but in such a case, the grammar should be altered. Further, attributes and process instructions may be separated from the XML data, and an XPointer used for their independent storage, separate from elements and text.
  (3) The text is compressed using a method such as XMill. Under these premised conditions, the encoding and decoding of XML data for the embodiment will now be described.

2. Encoding Processing 2.1 Overview of the System Configuration and the Encoding Processing FIG. 1 is a functional block diagram showing an example encoding system according to the first embodiment of the invention. The encoding system of this embodiment comprises: a syntax (type) generator 2-1, a separation unit 2—2, a syntax (value) generator 2-3, a transfer syntax generator 2-4, a compression unit 2-5, and a combining unit 2-6.

The syntax (type) generator 2-1 generates an ASN.1 abstract syntax (type) according to the DTD, and the separation unit 2—2 separates the XML data into the contents (text) of the element and the structure (the element name and the structure). The syntax (value) generator 2-3 generates an ASN.1 abstract syntax (value) by employing the structure used for the elements, and the transfer syntax generator 2-4 generates an ASN.1 transfer syntax. The compression unit 2-5 compresses the separated text, and the combining unit 2-6 combines the compressed text and the ASN.1 transfer syntax to obtain encoded XML data.

An explanation will now be given for an overview of the encoding processing performed by the thus arranged encoding system of the embodiment.

(Step 2-1) The syntax (type) generator 2-1 converts the DTD into an ASN.1 abstract syntax (type).

(Step 2—2) The separation unit 2—2 separates the text from the XML data that conforms to the DTD at step 2-1. It should be noted that step 2—2 may be performed in parallel with or before step 2-1.

(Step 2-3) The syntax (value) generator 203 converts the XML data (the syntax of the elements), which is obtained at step 2—2 by separating the text from the XML data, into an ASN.1 abstract syntax (value) that conforms to the ASN.1 abstract syntax (type) at step 2-1.

(Step 2-4) The transfer syntax generator 2-4 converts the ASN.1 abstract syntax (value) obtained at step 2-3 into an ASN.1 transfer syntax.

(Step 2-5) The compression unit 2-5 compresses the text separated from the XML data at step 2—2. It should be noted that step 2-5 is performed in parallel with steps 2-3 and 2-4.

(Step 2-6) The combining unit 2-6 combines the ASN.1 transfer syntax generated at step 2-4 and the text compressed at step 2-5 to generate the encoded XML data.

It should be noted that the encoding rule determined by the ASN.1 is employed to convert the ASN.1 abstract syntax (value) into the ASN.1 transfer syntax. The encoding rule can be, for example, BER, DER or PER. And since, according to PER, the type or the value uniquely determined according to the ASN.1 abstract syntax (type) is not encoded, the encoding efficiency achieved is especially high.

The above individual steps will now be explained in detail.

2.2 Step 2-1

At step 2-1, the DTD is converted into an ASN.1 abstract syntax (type). This method will now be described for each pattern of the content model.

2.2.1 Element Content

The element content of the XML data is formed by the combination of element names and operators. Generally, the element names are represented by character strings.

The operators are the ones used for designating the order in which the child elements in the element contents appear, and the appearance frequencies of the elements. As is well known, the ",", "|", "?", "*" and "+" operators are permitted for DTD.

In principle, an element name is represented by an identifier in the ASN.1 abstract syntax and an operator is also represented as a type in the ASN.1 abstract syntax. It should be noted, however, that since an identifier is not encoded in accordance with BER an element name need not be an identifier. An explanation will now be given for the type used to represent each operator.

2.2.1.1 "," Operator

In the ASN.1 abstract syntax, the defined type for the "," operator is "sequence". For example, when
```
<!ELEMENT a (b,c)>
<!ELEMENT b (#PCDATA)>
<!ELEMENT c (#PCDATA)>
```
is provided as the DTD, the ASN.1 abstract syntax (type) is
```
A::=SEQUENCE {
   b B,
   c C }
B::=NULL
C::=NULL,
```
where A, B and C are type references that are introduced for convenience sake. Any type references may be employed so long as no conflict arises. Further, since at step 2—2 the separation of the text occurs, the defined type for both B and C is "null".

2.2.1.2 "|" Operator

In the ASN.1 abstract syntax, the defined type for the "|" operator is "choice". For example, when
```
<!ELEMENT a (b|c)>
<!ELEMENT b (#PCDATA)>
<!ELEMENT c (#PCDATA)>
```
is provided as the DTD, the ASN.1 abstract syntax (type) is
```
A::=CHOICE {
   b B,
   c C }
B::=NULL
C::=NULL.
```

2.2.1.3 "?" Operator

In the ASN.1 abstract syntax, the assigned type for the "?" operator is "sequence" and the keyword is "OPTIONAL". For example, when
```
<!ELEMENT a (b?)>
<!ELEMENT b (#PCDATA)>
```
is provided as the DTD, the ASN.1 abstract syntax (type) is
```
A::=SEQUENCE {
   b B OPTIONAL }
B::=NULL.
```

2.2.1.4 "*" Operator

In the ASN.1 abstract syntax, assigned type for the "*" operator is "sequence-of". For example, when
```
<!ELEMENT a (b*)>
<!ELEMENT b (#PCDATA)>
```
is provided as the DTD, the ASN.1 abstract syntax (type) is
```
A::=SEQUENCE OF B
B::=NULL.
```

2.2.1.5 "+" Operator

In the ASN.1 abstract syntax, the assigned type for the "+" operator is "sequence-of" for a limited size. It should be noted, however, that since the size limitation has no effect on the encoding, the code for the "+" operator is the same as that for the "*" operator. For example, when
```
<!ELEMENT a (b+)>
<!ELEMENT b (#PCDATA)>
```
is provided as the DTD, the ASN.1 abstract syntax (type) is
```
A::=SEQUENCE SIZE (1 . . . MAX) OF B
B::=NULL.
```

2.2.1.6 No Operator

In some cases, in the contents of an element only one element name for which no operator is employed may be designated. In the ASN.1 abstract syntax, the assigned type in this case is "defined". For example, when
```
<!ELEMENT a (b)>
<!ELEMENT b (#PCDATA)>
```
is provided as the DTD, the ASN.1 abstract syntax (type) is
```
A::=B
B::=NULL.
```

2.2.2. Mixed Content

Mixed content is that which is obtained using the "|" operator to couple keyword "#PCDATA" with at least one element name, and by thereafter applying the "*" operator. In the ASN.1 abstract syntax, the types assigned to mixed content are "choice" and "sequence-of". For example, when
```
<!ELEMENT a (#PCDATA|b)*>
<!ELEMENT b (#PCDATA)>
```
is provided as the DTD, the ASN.1 abstract syntax (type) is
```
A::=SEQUENCE OF CHOICE {
   txt NULL,
   b B }
B::=NULL,
```
where txt is an identifier introduced for convenience sake that corresponds to the text included in the mixed content.

2.2.3 Empty

In the ASN.1 abstract syntax, the type assigned to an EMPTY is "null". For example, when
```
<!ELEMENT a EMPTY>
```
is provided as the DTD, the ASN.1 abstract syntax (type) is
```
A::=NULL.
```

2.2.4 ANY

An ANY is equivalent to the mixed content that is constituted by the keyword "#PCDATA" and all the element names declared by the DTD. Therefore, the expression of the ANY in the ASN.1 abstract syntax produces a mixed content expression.

2.3 Step 2—2

At step 213, the text is separated from the XML data that conforms to the DTD at step 2-1. For example, when the XML data is
```
<a>
   <b>10</b>
   <c>20</c>
</a>,
```
"10" is separated from element b, and "20" is separated from element c. As a result, the following XML data (the element name and the structure) are obtained.
```
<a>
   <b/>
   <c/>
</a>
```
The separated text can be collected for each element, and can then be compressed like XMill, for example. Of course, an alternate compression method can be employed.

2.4 Step 2-3

At step 2-3, the XML data at step 2—2 is converted into an ASN.1 abstract syntax (value) that conforms to the ASN.1 abstract syntax (type) at step 2-1. For example, when the ASN.1 abstract syntax (type) is
```
A::=SEQUENCE {
   b B,
   c C }
B::=NULL
C::=NULL,
``` and when the following XML data (the element name and the structure)

```
<a>
  <b/>
  <c/>
</a>
``` are converted into an ASN.1 abstract syntax (value),

```
aA::={
  b NULL,
  c NULL }
``` is obtained.

2.5 Step 2-4

At step 2-4, the ASN.1 abstract syntax (value) at step 2-3 is converted into an ASN.1 transfer syntax in accordance with the encoding rule determined by ASN.1. The encoding rule is, for example, BER, DER or PER (ALIGNED/UN-ALIGNED), of which PER (UNALIGNED) is preferable when increased encoding efficiency is desired. However, BER, DER or PER (ALIGNED) may also be employed.

2.6 Step 2-5

At step 2-5, the text is compressed. The well known LZ77 method and the well known technique that is described in a subdivision of the background art are specifically employed for the compression. The data compression may be performed separately for individual elements, or collectively for all the elements.

2.7 Step 2-6

At step 2-6, the ASN.1 transfer syntax is combined with the compressed text. These two can be simply coupled, or either a separator may be inserted between them, while taking into consideration the separation process that will be performed during decoding, or a header may be used to which data bit count information has been added.

3. Decoding Processing

3.1 Overview of the System Configuration and the Decoding Processing

Figure 2:
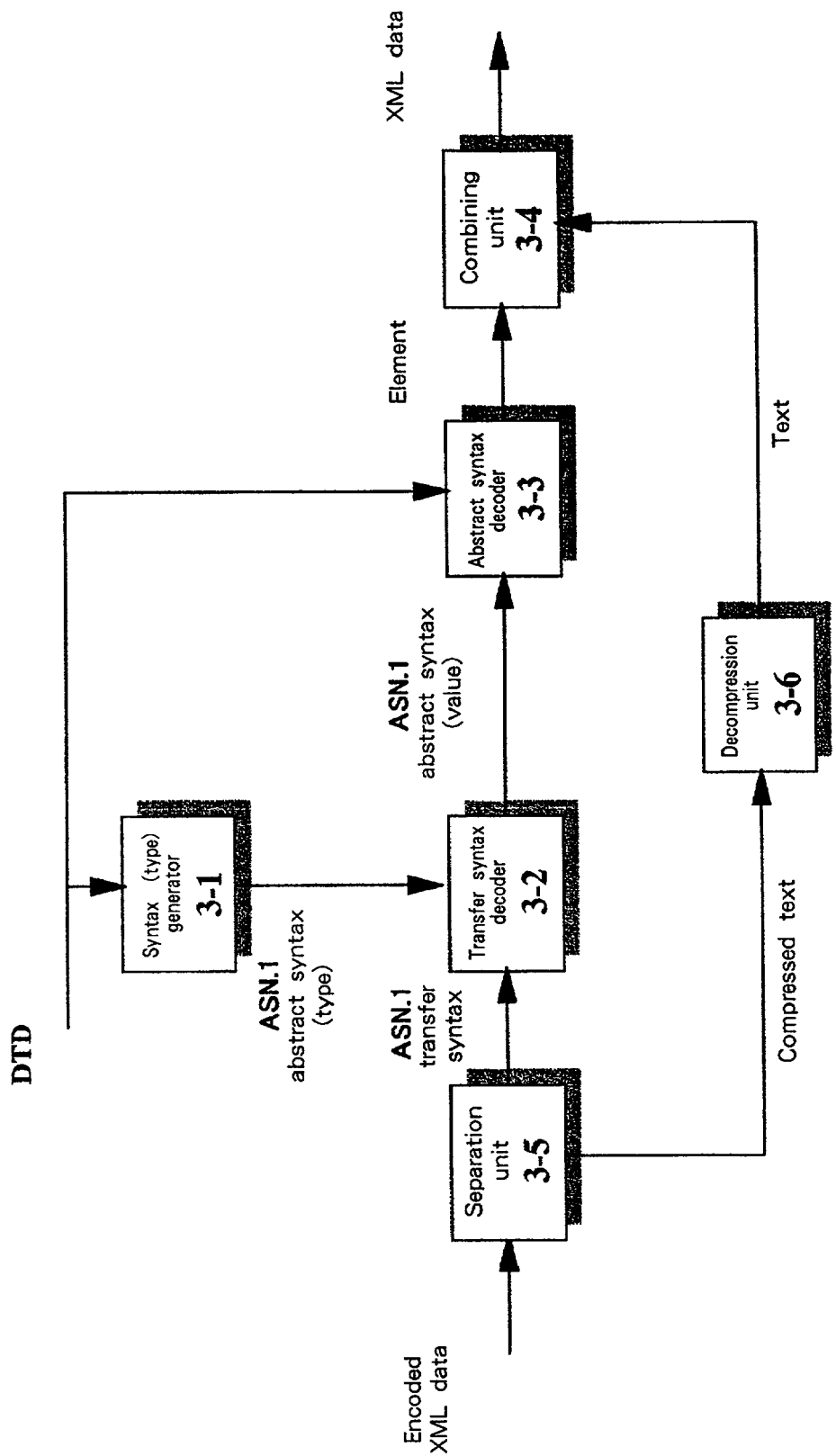
FIG. 2 is a functional block diagram showing an example decoding system according to the first embodiment of the present invention.

FIG. 2 is a functional block diagram illustrating an example decoding system according to the embodiment. The decoding system of the embodiment comprises: a syntax (type) generator 3-1, a transfer syntax decoder 3-2, an abstract syntax decoder 3—3, a combining unit 3-4, a separation unit 3-5 and a decompression unit 3-6.

The syntax (type) generator 3-1, as well as the syntax (type) generator 2-1, converts the DTD into an ASN.1 abstract syntax (type). The separation unit 3-5 separates encoded XML data to obtain an ASN.1 transfer syntax and compressed text, and the transfer syntax decoder 3-2 converts the ASN.1 transfer syntax into an ASN.1 abstract syntax (value) that conforms to the ASN.1 abstract syntax (type). The abstract syntax decoder 3—3 then converts the ASN.1 abstract syntax (value) into XML data (the element name and the structure) that conforms to the DTD. The combining unit 3-4 combines the decoded text (the contents of the element) and the XML data (the element name and the structure) and generates XML data, and the decompression unit 3-6 decompresses the compressed text.

The order in which the decoding processing is performed, while using the thus arranged decoding system of this embodiment, is substantially the inverse of the order in which the encoding processing was performed. An overview of the decoding processing is as follows.

(Step 3-1) The DTD is converted into an ASN.1 abstract syntax (type).

(Step 3-2) The encoded XML data is separated to obtain the compressed text and the ASN.1 transfer syntax. It should be noted that step 3-2 may be performed in parallel with or preceding step 3-1.

(Step 3—3) The ASN.1 transfer syntax is converted into an ASN.1 abstract syntax (value) that conforms to the ASN.1 abstract syntax (type) at step 3-1.

(Step 3-4) The ASN.1 abstract syntax (value) obtained at step 3—3 is converted into XML data (the element name and the structure) that conforms to the DTD at step 3-1.

(Step 3-5) The compressed text obtained at step 3-2 is decompressed.

(Step 3-6) The XML data (the element name and the structure) obtained at step 3-4 is combined with the text decompressed at step 3-5.

Since at steps 3-1 to 3-6 the decoding processes that are performed are obvious because they are inversions of the corresponding encoding processes, a detailed explanation will not be given for these processes. The following is a specific example of the conversion of DTD and of the use of PER to encode XML data that conform to the DTD.

4. Case Wherein the "," Operator is Included

In this case, the DTD that includes the "," operator and the XML data that conform to the DTD are employed. When

```
<!ELEMENT a (b,c)>
<!ELEMENT b (#PCDATA)>
<!ELEMENT c (#PCDATA)>
``` is provided as the DTD, at step 2-1, the ASN.1 abstract syntax (type) that is generated is

```
A::=SEQUENCE {
  b B,
  c C }
B::=NULL
C::=NULL.
```

When the XML data to be encoded that conform to this DTD are

```
<a>
  <b>10</b>
  <c>20</c>
</a>,
``` at step 2—2 the element (the element name and the structure of the XML data) obtained is

```
<a>
  <b/>
  <c/>
</a>,
``` and the ASN.1 abstract syntax (value), which at step 2-3 is generated from this element, is

```
aA::={
  b NULL,
  c NULL}.
```

According to PER, in principle, the values of elements of the "sequence" type are encoded in order. However, since the values of b and c are "null", and "null" is encoded as an empty bit string, the value acquired by a is an empty bit string. In this case, the obtained code is obtained exceptionally as $00000000_{(2)}$.

The ASN.1 transfer syntax is generated in this manner. It should be noted that the generation of the ASN.1 transfer syntax is performed at step 2-4, and that the subscript (2) indicates that the code represents a binary number.

Thereafter, the text compressed at step 2-5 and the ASN.1 transfer syntax ($00000000_{(2)}$) are combined at step 2-6, and encoded XML data is generated.

5. Case Wherein the "|" Operator is Included

In this case, the DTD that includes the "|" operator and the XML data that conforms to the DTD are employed. When
<!ELEMENT a (b|c)>
<!ELEMENT b (#PCDATA)>
<!ELEMENT c (#PCDATA)>
is provided as the DTD, at step 2-1 the ASN.1 abstract syntax (type) generated is
A::=CHOICE {
  b B,
  c C }
B::=NULL
C::=NULL.

When the XML data to be encoded that conforms to this DTD is
<a>
  <b>10</b>
</a>,
at step 2—2 the element (the element name and the structure of the XML data) that is obtained is
<a>
  <b/>
</a>.

The ASN.1 abstract syntax (value), which at step 2-3 is generated from this element, is
aA::=b: NULL.

According to PER, as the value of the "choice" type, the index (0 base) of a selected element is encoded, and then the value of the element is encoded. In this case, since b is selected, the index is 0, and the value of b is null. Thus, the value obtained for a is
$0XXXXXXX_{(2)}$,
where each X denotes a padding bit that is added in order to obtain a multiple of 8 bits. In this manner, the ASN.1 transfer syntax is generated. It should be noted that the generation of compressed text and the combining of the compressed text and the ASN.1 transfer syntax are performed in the same manner as in "4. Case wherein the "," operator is included".

6. Case Wherein the "?" Operator is Included

In this case, the DTD that includes the "?" operator and the XML data that conforms to the DTD are employed. When
<!ELEMENT a (b?,c)>
<!ELEMENT b (#PCDATA)>
<!ELEMENT c (#PCDATA)>
is provided as the DTD, the ASN.1 abstract syntax (type) that is generated at step 2-1 is
A::=SEQUENCE {
  id0 SEQUENCE {
    b B OPTIONAL },
  c C }
B::=NULL
C::=NULL.

When the XML data to be encoded that conforms to this DTD is
<a>
  <b>10</b>
  <c>20</c>
</a>,
the element (the element name and the structure of the XML data) that is obtained at step 2—2 is
<a>
  <b/>
  <c/>
</a>.

The ASN.1 abstract syntax (value), which at step 2-3 is generated from this element, is
aA::={
  id0 {
    b NULL }
  c NULL }.

According to PER, when the designation "OPTIONAL" is applied for at least one of the "sequence" type elements, a bit string used to represent the elements that are present is added before the values of the elements are encoded. When an element is present, a bit in the bit string is set to 1, while if the element is not present, the bit is reset to 0. In this case, since the designation "OPTIONAL" is applied only for b, and since this element is present, first, a bit string containing a bit set to 1 is added. Then, the values of b and c are encoded, and since for both a "null" result is obtained, the value assigned to a is
$1XXXXXXX_{(2)}$.

In this manner, the ASN.1 transfer syntax is generated. It should be noted that the generation of compressed text and the combining of the compressed text and the ASN.1 transfer syntax are performed in the same manner as in "4. Case wherein the "," operator is included".

7. Case Wherein the "*" Operator is Included

In this case, the DTD that includes the "*" operator and the XML data that conforms to the DTD are employed. When
<!ELEMENT a (b*)>
<!ELEMENT b (#PCDATA)>
is provided as the DTD, the ASN.1 abstract syntax (type) generated at step 2-1 is
A::=SEQUENCE OF B
B::=NULL.

When the XML data to be encoded that conform to this DTD are
<a>
  <b>10</b>
  <b>20</b>
</a>,
the element (the element name and the structure of the XML data) obtained at step 2—2 is
<a>
  <b/>
  <b/>
</a>.

The ASN.1 abstract syntax (value), which at step 2-3 is generated from this element, is
aA::={
  NULL,
  NULL}.

In accordance with PER, to obtain the "sequence-of" type value, first, the number of elements is encoded and then the values of these elements are encoded in order. In this case, since the number of elements is two, a value of 2 is encoded. Then, since the values of the elements are encoded and the result obtained in each case is "null", the value of a is
$00000010_{(2)}$.

In this manner, the ASN.1 transfer syntax is generated. It should be noted that the generation of compressed text and the combining of the compressed text and the ASN.1 transfer syntax are performed in the same manner as in "4. Case wherein the "," operator is included".

8. Case Wherein Mixed Content is Included

In this case, the DTD that includes mixed content and the XML data that conforms to the DTD are employed. When
<!ELEMENT a (#PCDATA|b)*>
<!ELEMENT b (#PCDATA)> is provided as the DTD, at step 2-1 the ASN.1 abstract syntax (type) that is generated is
A::=SEQUENCE OF CHOICE {
  txt NULL,
  b NULL}.

When the XML data to be encoded that conform to this DTD are
<a>
  xxx
  <b>10</b>
  <b>20</b>
</a>, the element (the element name and the structure of the XML data) obtained at step 2—2 is
<a>
  <txt/>
  <b/>
  <b/>
</a>.

It should be noted that "xxx" represents the contents of the text, and "txt" represents an element that is the text. The ASN.1 abstract syntax (value), which is generated from this element at step 2-3, is
aA::={
  txt: NULL,
  b: NULL,
  c: NULL}.

The values of the "sequence-of" type and of the "choice" type are encoded in the above described manner. In this example, the number of elements is three, and since txt, b and b, in the named order, are selected as elements, the indexes are 0, 1 and 1. Since all these values are null, the value of a is
$00000011_{(2)}$
$011XXXXX_{(2)}$.

In this manner, the ASN.1 transfer syntax is generated. It should be noted that the generation of compressed text and the combining of the compressed text and the ASN.1 transfer syntax are performed in the same manner as in "4. Case wherein the "," operator is included".

SECOND EXAMPLE EMBODIMENT

In the first embodiment, an explanation was given in which the assumption was that the XML data was constituted merely by elements and text, and another method is used to manage others (e.g., an attribute and a process instruction). In the second embodiment, example processing for XML data that includes an attribute and a process instruction will be described. That is, a method will be explained whereby special elements are used to represent an attribute and a process instruction using special elements, and to embed them in the XML data. In this case, it is required the grammar is changed. It should be noted that, regardless of the example given in this embodiment, a method may also be employed whereby an attribute and a process instruction are separated from XML data and stored using an XPointer. The method used for embedding an attribute and a process instruction as special elements in the XML data can be understood as being a pre-process and a post-process for the processing of the first embodiment. As a result, XML data having a greater range can be handled. As an example pre-process, an explanation will now be given for a method employed for embedding, in XML data, entries that are defined by the DTD.

9.1 Overview of the Pre-process System and the Pre-process

Figure 3:
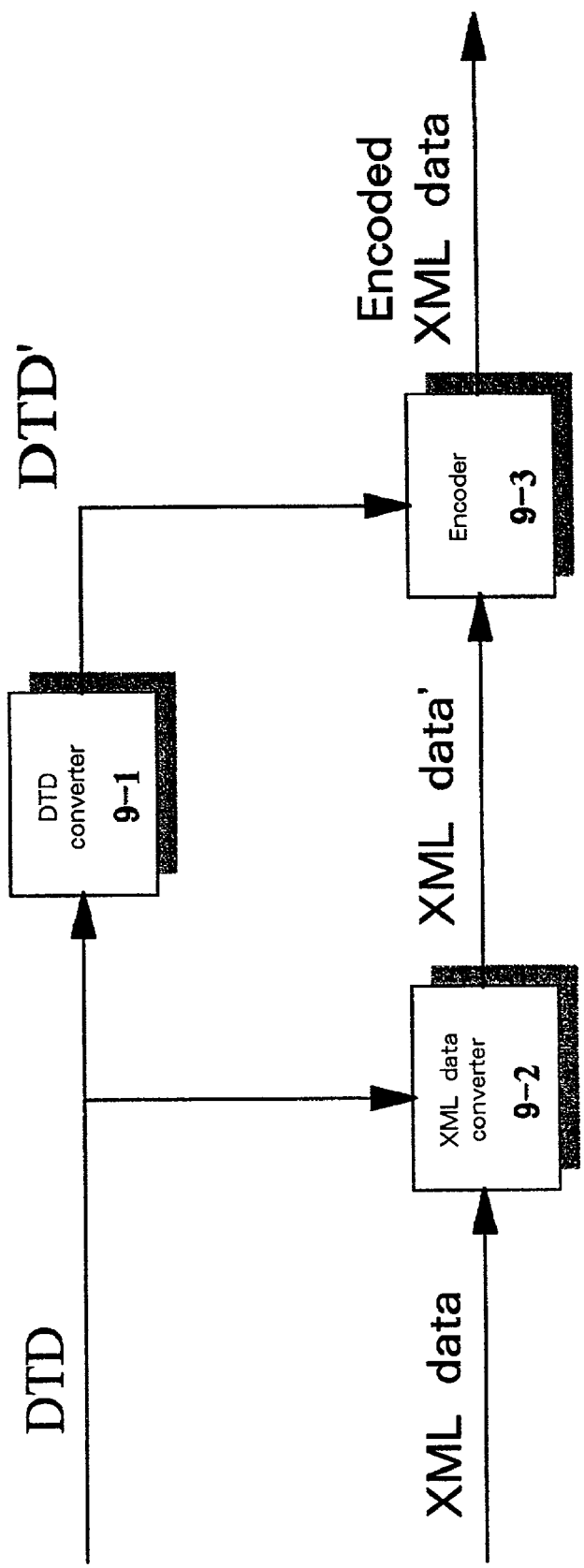
FIG. 3 is a functional block diagram showing an example pre-process system according to a second embodiment of the present invention.

FIG. 3 is a functional block diagram showing an example pre-process system according to the embodiment. The pre-process system of this embodiment comprises a DTD converter 9-1, an XML data converter 9-2 and an encoder 9-3. The DTD converter 9-1 converts a representative DTD into a DTD' while taking entries other than the element into account. The XML data converter 9-2 converts the XML data that conforms to the representative DTD into XML data' that conforms to the DTD'. The encoder 9-3 is the encoding system employed for the first embodiment.

The pre-process method used for this embodiment comprises the steps: conversion of the DTD by the DTD converter 9-1, and conversion of the XML data by the XML data converter 9-2. Then, when following these conversions the encoding process in the first embodiment is performed, encoded XML data is generated.

9.2 DTD Conversion Process

The DTD includes not only an element type declaration but also three other declarations: an attribute-list declaration, an entity declaration, and a notation declaration.

The entities defined in the entity declaration are a parsed entity, an unparsed entity, and a parameter entity. The parsed entity can be referred to, in text or an attribute value, at any location, and is simply expanded. Since the unparsed entity can only be referred to by an attribute value, so long as the attribute can be processed, the operation is satisfactory. But since the parameter entity can be referred to only in the DTD, the operation is not considered in this embodiment.

Since the notation defined in the notation declaration can be referred to merely by using the attribute value, so long as the attribute can be processed, the operation is satisfactory. As a result, the performance of the pre-process for the DTD is a precursor of the performance of the pre-process for the element type declaration and of the attribute-list declaration.

In the attribute-list declaration, an attribute to be provided for a specific element and the value that the attribute can obtain are defined. As needed, a default value is also defined. The provision of the attribute for an element varies, depending on whether the attribute is REQUIRED or IMPLIED or on whether a default value is defined and whether it is FIXED. Therefore, while, in principle, the attribute is represented as an element, it is preferable that the expression of the attribute be changed more or less in accordance with the definition.

The rules for changing the element type declaration in accordance with the attribute-list declaration are as follows.

(1) An attribute is represented as an element (hereinafter referred to as an attribute element), and the element name is uniquely determined from the attribute name, e.g., "the element name of a parent"+"_"+"attribute name". It should be noted, however, that the element name is not yet used. Thereafter, this naming rule is employed to determine the element name.

(2) All of the attribute values are handled as "CDATA", and are included in the attribute element.

(3) The attribute element is inserted into the first of the child elements of the parent element.
(4) The REQUIRED attribute is represented as an element.
(5) The IMPLIED attribute is represented as an element for which the "?" operator is employed.
(6) The attribute for which a default value is defined is represented as an element for which the "?" operator is employed.
(7) The attribute for which the FIXED default value is defined is ignored.

A specific example will now be described. For example, when
```
<!ELEMENT a (b,c)>
<!ATTLIST a w CDATA #REQUIRED
  x ID # IMPLIED
  y (0|1|2) "0"
  z CDATA #FIXED "abc">
```
is provided as the DTD, the DTD' is
```
<!ELEMENT a (a_w,a_x?,a_y?,b,c)>
<!ELEMENT a_w (#PCDATA)>
<!ELEMENT a_x (#PCDATA)>
<!ELEMENT a_y (#PCDATA)>.
```

9.3 XML Data Conversion Process

The XML data that conforms to the DTD is converted into XML data that conforms to the DTD'. Basically, the attribute provided for an element need only be converted into an attribute element, and the obtained attribute element inserted into the first of the child elements of the element. It should be noted that, when the default value is defined for the attribute and the attribute value matches the default value, the attribute is not converted into an attribute element.

When, for example,
```
<a w="xyz" y="0" z="abc">
  <b> ... </b>
  <c> ... </C>
</a>
```
is employed as XML data that conforms to the DTD in 9.2, the XML data' is converted into
```
<a>
  <a_w>xyz</a_w>
  <b> ... </b>
  <c> ... </c>
</a>.
```
Since the attribute x is not provided for the element a, the element a_x does not appear. Further, since the value of the attribute y matches the default value, the element a_y does not appear, either. In addition, since the FIXED default value is defined for the attribute z, it is deleted.

9.4 Overview of the Post-process System and the Post-process

Figure 4:
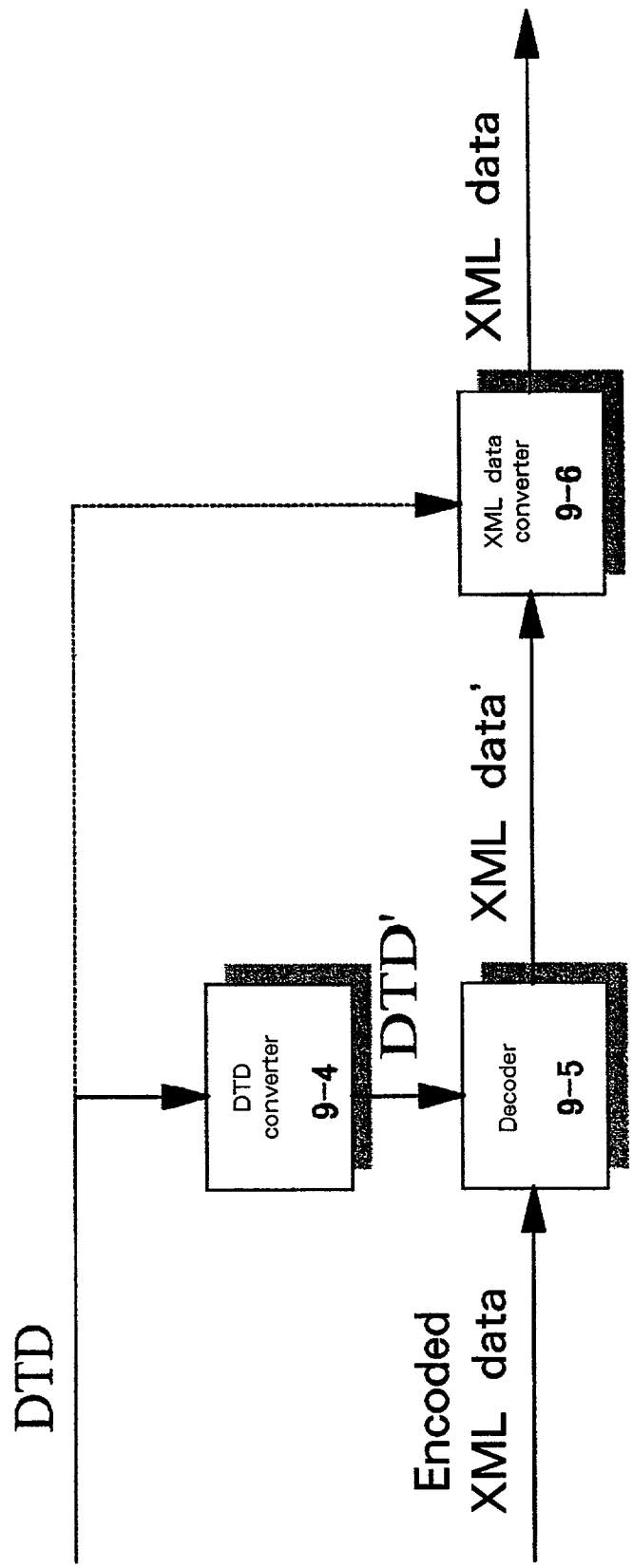
FIG. 4 is a functional block diagram showing an example post-process system according to the second embodiment of the present invention.

FIG. 4 is a functional block diagram showing an example post-process system according to the embodiment. The post-process system of this embodiment comprises: a DTD converter 9-4, a decoder 9-5, and an XML data converter 9-6. The DTD converter 9-4 is the same as the DTD converter 9-1, and the decoder 9-5 is the decoding system used in the first embodiment. The XML data converter 9-6 converts the XML data' that conforms to the DTD' into XML data that conforms to the DTD.

The post-process method of this embodiment comprises the steps, performed following the completion of the decoding process in the first embodiment, for the DTD conversion performed by the DTD converter 9-4 and for the XML data conversion performed by the XML data converter 9-6. Since the DTD conversion performed by the DTD converter 9-4 is the same as the one employed in 9.2, and since for the XML data conversion the XML data converter 9-6 performs a process that is the inverse of the one employed for the conversion in 9.3, detailed explanations for these operations will not be given. A broken-line arrow in FIG. 4 indicates that the DTD can be referred to as needed, and so long as the attribute element can be identified and the attribute name can be uniquely determined from the name of the attribute element, the DTD need not be referred to. Furthermore, since the post-process depends on how the pre-process has been performed, it is natural for the post-process of this embodiment to be changed when the pre-process differs.

10. Effects Obtained by the Embodiments

By employing the encoding method of the first or the second embodiment, the XML data can be efficiently compressed. The effects obtained by the embodiments will now be described while being compared with the effects obtained by XComp.

The encoding method of this invention is the same as XComp because, in XML data encoding, the information uniquely determined by the DTD is not encoded. However, the compression efficiency obtained with XComp is reduced when XML data has a specific structure. Specifically, the compression efficiency is reduced when the "?" operator or the "*" operator (includes the "+" operator) is employed for the element.

10.1 "?" Operator

According to the method of this invention, a bit string is employed to indicate the presence of an element, while according to XComp, indexes provided for each existing elements (choices) are enumerated. This difference is particularly remarkable when several elements for which the "?" operator is employed persist and all continue to be present.

For example, assume XML data:
```
<a>
  <b>xxx</b>
  <c>yyy</c>
</a>
```
that conforms to DTD:
```
<!ELEMENT a (b?,c?)>
<!ELEMENT b (#PCDATA)>
<!ELEMENT c (#PCDATA)>.
```
In this XML data, elements b and c coexist. The XML data is encoded into $11_{(2)}$ using the method of the invention, and to simplify the explanation, a padding bit is not added.

As for the XComp, when automaton:

|    | S1 | S2  | S3  | S4           |
|----|----|-----|-----|--------------|
| S1 | —  | b/1 | c/2 | $\epsilon$/3 |
| S2 | —  | —   | c/1 | $\epsilon$/2 |
| S3 | —  | —   | —   | $\epsilon/\epsilon$ |
| S4 | —  | —   | —   | —            | is prepared, an index string of 11 is obtained. And when this index string is converted into a 0 base and the 0 base is then encoded by using the minimum required number of bits, code $000_{(2)}$ is obtained. Subsequently, when the code obtained by the method of the invention is compared with the code obtained by XComp, it is found that the code obtained by employing this invention is shorter by one bit.

Tables 1 shows the results obtained with the method of the invention compared with the results obtained with XComp, when the objective is an evaluation of the number of bits required for encoding several elements, in which the "?" operator is employed, that persist, continue to be present. As is apparent from table 1, the encoding efficiency provided by the method of the invention is greater than is that provided by XComp. Generally, when there are n persistent elements for which the "?" operator is employed, Xcomp requires O(nlog n) bits, while the method of the invention requires only O(n) bits.

TABLE 1

|  | Xcomp (prior art) | | | Present invention |
|---|---|---|---|---|
| The number of ?s | The number of choices | The number of bits | The total number of bits | The number of bits |
| 1 | 2 | 1 | 1 | 1 |
| 2 | 3, 2 | 2, 1 | 3 | 2 |
| 3 | 4, 3, 2 | 2, 2, 1 | 5 | 3 |
| 4 | 5, 4, 3, 2 | 3, 2, 2, 1 | 8 | 4 |
| 5 | 6, 5, 4, 3, 2 | 3, 3, 2, 2, 1 | 11 | 5 |

10.2 "*" Operator

According to the method of this invention, the number of existing elements is encoded, while according to the XComp, indexes provided for the existing elements (choices) are listed. This difference is particularly remarkable when many elements are present in which the "*" operator is employed.

For example, assume XML data:
<a>
  <b>xxx</b>
  <b>yyy</b>
  . . .
  <b>zzz</b>
</a> that conforms to DTD:
<!ELEMENT a (b*)>
<!ELEMENT b (#PCDATA)>.

In this case, further assume that the element b has appeared eight times. Using the method of the invention, the XML data is encoded into $00001000_{(2)}$ by the method of the invention.

As for the XComp, when automaton:

|  | S0 | S1 |
|---|---|---|
| S0 | b/1 | ε/2 |
| S1 | — | — | is prepared, an index string of 111111112 is obtained. And when this index string is converted into 0 base and the 0 base is then encoded by using the minimum required number of bits, code $000000001_{(2)}$ is obtained. Thereafter, when the code obtained by the method of the invention is compared with the code obtained by XComp, it is found that the code obtained by this invention is shorter by one bit.

Figure 5:
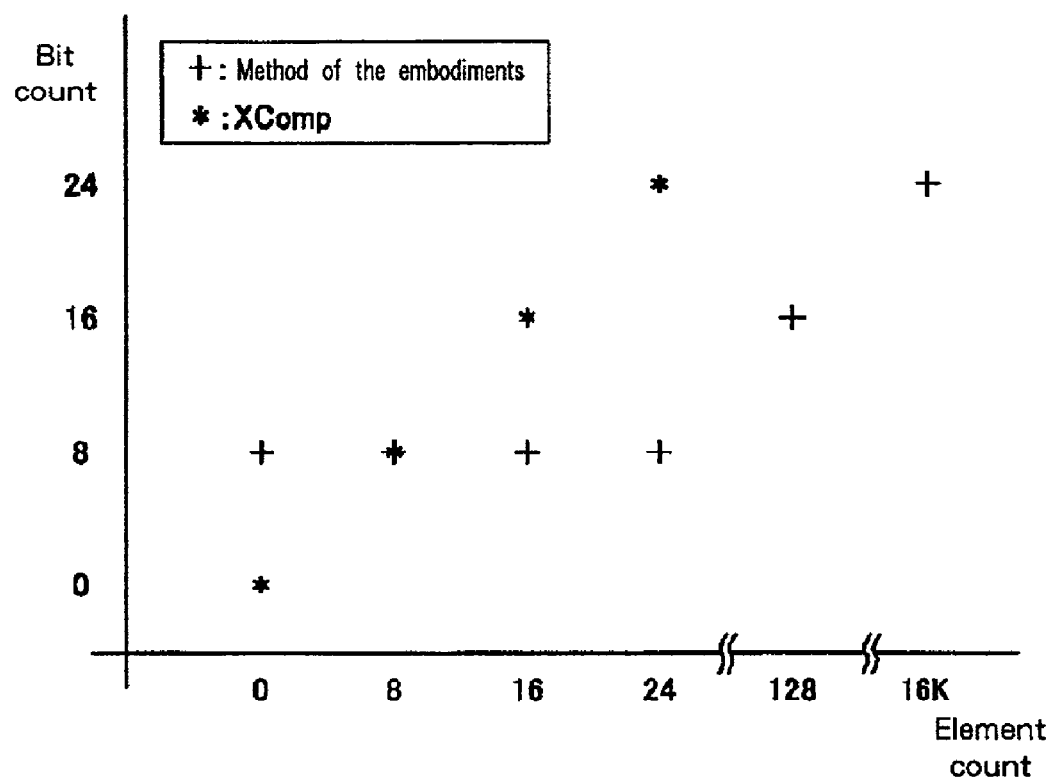
FIG. 5 is a diagram showing a comparison of the encoding efficiency provided by the encoding methods of the embodiments and of XComp.

FIG. 5 is a graph showing a comparison between the method of the invention and XComp of the number of bits required to encode many elements that are present for which the "*" operator is employed. As is apparent from FIG. 5, when eight or more elements are present, these elements can be encoded more efficiently when the method of the invention is used than when XComp is used. The method of the invention requires a number of bits having the same order as in XComp; but in actuality, a smaller number of bits is sufficient.

The present invention has been specifically explained by using the described embodiments. However, the invention is not limited to these embodiments and can be variously modified without departing from the scope of the invention. For example, the method of the invention may be employed by combining multiple operators. There are four operators ",", "|", "?" and "*" (includes "+") that can be used for the content model. Therefore, while taking the employment order into account, there are 16 operator combinations, and for each combination, XML data can be converted into an ASN.1 abstract syntax in the same manner as in the embodiments. Thus, XML data that includes any combination of operators can be encoded when the invention is used.

One of the points applicable to the method explained in these embodiments is the definition of the grammar, and the expression, in ASN.1 abstract syntax, of the XML data that conforms to the grammar. However, another expression may also be employed.

For example, in the above embodiments, the "?" operator is represented by using a combination of the "sequence" type and the keyword "OPTIONAL". Specifically, the DTD:
<!ELEMENT a (b?,c)> is converted into an ASN.1 abstract syntax:
A::=SEQUENCE {
  id0 SEQUENCE {
    b B OPTIONAL },
  c C }.

The DTD may also be converted into an ASN.1 abstract syntax:
A::=SEQUENCE {
  b B OPTIONAL,
  c C }.

This conversion is convenient because the code obtained by BER or DER is shorter. However, since this conversion method does not function well for the following DTD:
<!ELEMENT a (b?)>
<!ELEMENT a (b?|c)>, the representation as in the embodiments is more appropriate.

Further, in the embodiments, each of the operators is represented by one of the types. For example, the "," operator is represented by the "sequence" type, and the "|" operator is represented by the "choice" type. In addition, another method can be employed according to which the use of an operator is regarded as "production", and for employing the "sequence" type to represent all the operators. According to this method, the "|" operator and the "*" operator (includes the "+" operator), which are not represented by the sequence type, and the case wherein no operator is present can be represented as follows.
<!ELEMENT a(b|c)> can be represented as
  A::=SEQUENCE {
    id0 CHOICE {
      b B,
      c C }};
<!ELEMENT a(b*)> can be represented as
  A::=SEQUENCE {
    b SEQUENCE OF B }; and
<!ELEMENT a(b)> can be represented as
  A::=SEQUENCE {
    b B }.

Since according to the expression method all the operators are represented by the "sequence" type, the operators can be easily identified visually. Further, since the representation method corresponds to the wrapping of the operator by the "sequence" type, this method can function well even with a combination of multiple operators. However, since the types are always encoded by BER or DER, the length of the code is increased each time a type is inserted. Therefore, more types than necessary should not be inserted, and for this reason, it is appropriate that the operators be represented by employing the method of the invention.

Advantageous effects obtained by this invention include the following consideration. The XML data encoding (compression) efficiency can be improved, and XML data, including descriptions other than the elements such as attributes, can be encoded (compressed). Thus, the communication load imposed by the transfer of XML data can be reduced, as can the capacity of the storage areas that are used for XML data.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. An XML data encoding method comprising the steps of:
   converting into ASN.1 abstract syntax type a grammar definition for defining the grammar of XML data;
   separating said XML data into contents comprising text of a syntactic element and a structure representing the syntactic element comprising an element name including the structure;
   converting said structure into an ASN.1 abstract syntax value that conforms to said ASN.1 abstract syntax type;
   converting said ASN.1 abstract syntax value into an ASN.1 transfer syntax;
   compressing said text contents of said syntactic element; and
   combining the compressed text contents of said syntactic element and said ASN.1 transfer syntax to thereby generate encoded XML data.

2. An XML data encoding method according to claim 1, wherein said grammar definition includes an attribute, a process instruction and a grammar definition entry other than said syntactic element,
   further comprising the steps of:
   converting said grammar definition into a different grammar definition, so that said grammar definition entry other than said syntactic element is included in said syntactic element as a special element; and
   converting said XML data into different XML data in conformation with said different grammar definition.

3. An XML data encoding method according to claim 1, wherein said grammar definition is a DTD, the element contents include operators selected from among: ",", "|", "?", "*" and "+", no operator, any combination of these operators; and wherein for said ASN.1 abstract syntax type, said "," operator is represented by a "sequence" type, said "|" operator is represented by a "choice" type, said "?" operator is represented by a combination of a "sequence" type and a keyword "OPTIONAL", said "*" operator is represented by a "sequence-of" type, said "+" operator is represented by a "sequence-of" type having a limited size, and a case wherein none of said operators is present is represented by a "defined" type.

4. An XML data encoding method according to claim 3, wherein at said step of converting said grammar definition into said different grammar definition, an attribute included in said grammar definition is represented as an attribute element that can be uniquely determined, and is handled as the child element of a parent element of said attribute; the attribute value of said attribute is regarded as CDATA and is handled as the child element of said attribute element; when said attribute is "REQUIRED", said attribute element is represented by a syntactic element; when said attribute is "IMPLIED", and/or when a default value is defined as said attribute, said attribute element is represented by an element for which said "?" operator is employed, and wherein at said step of converting said XML data into different XML data, an attribute included in said syntactic element of said XML data is represented as an attribute element that can be uniquely determined, and is handled as the child element of a parent element of said attribute.

5. A method according to claim 4, further comprising excepting a case wherein a default value is defined as said attribute and the attribute value of said attribute matches said default value.

6. An XML data encoding method according to claim 1, wherein said step of converting said ASN.1 abstract syntax value into said ASN.1 transfer syntax comprises employing PER rules.

7. An article of manufacture comprising a computer usable medium having computer readable program code means embodied therein for causing data encoding, the computer readable program code means in said article of manufacture comprising computer readable program code means for causing a computer to effect the steps of claim 1.

8. A program storage device readable by machine, tangibly embodying a program of instructions executable by the machine to perform method steps for data encoding, said method steps comprising the steps of claim 1.

9. A method for decoding encoded XML data comprising the steps of:
converting a grammar definition for defining the grammar of XML data into ASN.1 abstract syntax type;
separating encoded XML data into an ASN.1 transfer syntax and compressed text contents of a compressed syntactic element;
converting said ASN.1 transfer syntax into an ASN.1 abstract syntax value that conforms to said ASN.1 abstract syntax type;
converting said ASN.1 abstract syntax value into an XML data structure that conforms to said grammar definition;
decompressing said compressed text contents of said compressed syntactic element; and
combining the decompressed text contents of said syntactic element and said XML data structure.

10. A method according to claim 9, wherein said grammar definition includes an attribute, a process instruction and a grammar definition entry other than said syntactic element, further comprising the steps of:
converting said grammar definition into a different grammar definition, so that said grammar definition entry other than said syntactic element is included in said syntactic element as a special element; and
converting said decoded XML data into different XML data in conformation with said different grammar definition.

11. A method according to claim 9, wherein said grammar definition is a DTD, the element contents of which include operators selected from among: ",", "|", "?", "*" and "+", no operator, any combination of these operators; and wherein for said ASN.1 abstract syntax type, said "," operator is represented by a "sequence" type, said "|" operator is represented by a "choice" type, said "?" operator is represented by a combination of a "sequence" type and a keyword "OPTIONAL", said "*" operator is represented by a "sequence-of" type, said "+" operator is represented by a "sequence-of" type having a limited size, and a case wherein none of said operators is present is represented by a "defined" type.

12. A method according to claim 11, wherein at said step of converting said grammar definition into a different grammar definition, an attribute included in said grammar definition is represented as an attribute element that can be uniquely determined, and is handled as the child element of a parent element of said attribute; the attribute value of said attribute is regarded as CDATA and is handled as the child element of said attribute element; said attribute element is represented by a syntactic element when said attribute is "REQUIRED"; said attribute element is represented by an element for which said "?" operator is employed when said attribute is "IMPLIED" and/or when a default value is defined as said attribute, and wherein at said step of converting said decoded XML data into different XML data, said attribute element that is included as said child element in said syntactic element of said decoded XML data is converted into the attribute of said syntactic element and/or the attribute value thereof.

13. A method according to claim 9, wherein at said step of converting said ASN.1 transfer syntax into said ASN.1 abstract syntax value comprises employing PER rules.

14. The method according to claim 9, wherein the structure is an element name including the structure.

15. An article of manufacture comprising a computer usable medium having computer readable program code means embodied therein for causing data decoding, the computer readable program code means in said article of manufacture comprising computer readable program code means for causing a computer to effect the steps of claim 9.

16. A program storage device readable by machine, tangibly embodying a program of instructions executable by the machine to perform method steps for data decoding, said method steps comprising the steps of claim 9.

17. An XML data encoding system comprising:
means for converting into ASN.1 abstract syntax type a grammar definition for defining the grammar of XML data;
means for separating said XML data into contents comprising text of a syntactic element and a structure representing the syntactic element comprising an element name including the structure;
means for converting said structure into an ASN.1 abstract syntax value that conforms to said ASN.1 abstract syntax type;
means for converting said ASN.1 abstract syntax value into an ASN.1 transfer syntax;
means for compressing said text contents of said syntactic element; and
means for combining the compressed text contents of said syntactic element and said ASN.1 transfer syntax to thereby generate encoded XML data.

18. An XML data encoding system according to claim 17, wherein said grammar definition includes an attribute, a process instruction and a grammar definition entry other than said syntactic element,
further comprising:
means for converting said grammar definition into a different grammar definition, so that said grammar definition entry other than said syntactic element is included in said syntactic element as a special element; and
means for converting said XML data into different XML data in conformation with said different grammar definition.

19. An XML data encoding system according to claim 17, wherein said grammar definition is a DTD, the element contents of which include operators selected from among: ",", "|", "?", "*" and "+", no operator, any combination of these operators; and wherein for said ASN.1 abstract syntax type, said "," operator is represented by a "sequence" type, said "|" operator is represented by a "choice" type, said "?" operator is represented by a combination of a "sequence"

type and a keyword "OPTIONAL", said "*" operator is represented by a "sequence-of" type, said "+" operator is represented by a "sequence-of" type having a limited size, and a case wherein none of said operators is present is represented by a "defined" type.

20. An XML data encoding system according to claim 19, wherein said means, for converting said grammar definition into said different grammar definition, represents an attribute included in said grammar definition as an attribute element that can be uniquely determined, and handles said attribute as the child element of a parent element of said attribute; regards the attribute value of said attribute as CDATA and handles said attribute value as the child element of said attribute element; represents said attribute element by a syntactic element when said attribute is "REQUIRED"; and represents said attribute element by an element for which said "?" operator is employed when said attribute is "IMPLIED", and/or when a default value is defined as said attribute, and wherein said means, for converting said XML data into different XML data, represents an attribute included in said syntactic element of said XML data as an attribute element that can be uniquely determined, and handles said attribute as the child element of a parent element of said attribute. It should be noted that a case is excepted wherein a default value is defined as said attribute and the attribute value of said attribute matches said default value.

21. An XML data encoding system according to claim 17, wherein said means, for converting said ASN.1 abstract syntax value into said ASN.1 transfer syntax, employs the PER rules.

22. A computer program product comprising a computer usable medium having computer readable program code means embodied therein for causing data encoding, the computer readable program code means in said computer program product comprising computer readable program code means for causing a computer to effect the functions of claim 17.

23. A system for decoding encoded XML data comprising:
   means for converting a grammar definition for defining the grammar of XML data into ASN.1 abstract syntax type;
   means for separating encoded XML data into an ASN.1 transfer syntax and compressed text contents of a compressed syntactic element;
   means for converting said ASN.1 transfer syntax into an ASN.1 abstract syntax value that conforms to said ASN.1 abstract syntax type;
   means for converting said ASN.1 abstract syntax value into an element name including an XML data structure that conforms to said grammar definition;
   means for decompressing said compressed text contents of said compressed syntactic element; and
   means for combining the decompressed text contents of said syntactic element and said XML data structure.

24. A system according to claim 23, wherein said grammar definition includes an attribute, a process instruction and a grammar definition entry other than said syntactic element,
   further comprising:
   means for converting said grammar definition into a different grammar definition, so that said grammar definition entry other than said syntactic element is included in said syntactic element as a special element; and
   means for converting said decoded XML data into different XML data in conformation with said different grammar definition.

25. A system according to claim 23, wherein said grammar definition is a DTD, the element contents of which include operators selected from among: ",", "|", "?", "*" and "+", no operator, any combination of these operators; and wherein for said ASN.1 abstract syntax type, said "," operator is represented by a "sequence" type, said "|" operator is represented by a "choice" type, said "?" operator is represented by a combination of a "sequence" type and a keyword "OPTIONAL", said "*" operator is represented by a "sequence-of" type, said "+" operator is represented by a "sequence-of" type having a limited size, and a case wherein none of said operators is present is represented by a "defined" type.

26. A system according to claim 25, wherein said means, for converting said grammar definition into a different grammar definition, represents an attribute included in said grammar definition as an attribute element that can be uniquely determined, and handles said attribute as the child element of a parent element of said attribute; regards, as CDATA, the attribute value of said attribute and handles said attribute value as the child element of said attribute element; represents said attribute element by a syntactic element when said attribute is "REQUIRED"; and represents said attribute element by an element for which said "?" operator is employed when said attribute is "IMPLIED" and/or when a default value is defined as said attribute, and wherein said means, for converting said decoded XML data into different XML data, converts said attribute element, which is included as said child element in said syntactic element of said decoded XML data, into the attribute of said syntactic element and/or the attribute value thereof.

27. A system according to claim 23, wherein said means, for converting said ASN.1 transfer syntax into said ASN.1 abstract syntax value, employs the PER rules.

28. A computer program product comprising a computer usable medium having computer readable program code means embodied therein for causing data encoding, the computer readable program code means in said computer program product comprising computer readable program code means for causing a computer to effect the functions of claim 23.

* * * * *